US005689372A

United States Patent [19]

Morton

[11] Patent Number: 5,689,372

[45] Date of Patent: Nov. 18, 1997

[54] INTEGRAL IMAGING WITH ANTI-HALATION

[75] Inventor: Roger Roy Morton, Penfield, N.Y.

[73] Assignee: Eastman Kodak Company, Rochester, N.Y.

[21] Appl. No.: 577,633

[22] Filed: Dec. 22, 1995

[51] Int. Cl.$^6$ .................... G02B 27/10

[52] U.S. Cl. .................... 359/623; 359/620; 430/946

[58] Field of Search .................... 359/620, 623; 430/946

[56] References Cited

U.S. PATENT DOCUMENTS

| | | | |
|---|---|---|---|
| 1,817,963 | 8/1931 | Capstaff | 430/510 |
| 1,918,705 | 7/1933 | Ives | 354/98 |
| 2,002,090 | 5/1935 | Ives . | |
| 2,039,648 | 5/1936 | Ives | 95/18 |
| 2,274,782 | 3/1942 | Gaspar . | |
| 2,327,828 | 8/1943 | Simmons . | |
| 2,499,453 | 3/1950 | Bonnet | 88/1 |
| 2,500,511 | 3/1950 | Bonnet | 88/1 |
| 2,785,976 | 3/1957 | Ogle | 96/81 |
| 3,751,258 | 8/1973 | Howe et al. | 96/81 |
| 4,190,321 | 2/1980 | Dorer et al. | 350/165 |
| 4,252,843 | 2/1981 | Dorer et al. | 427/162 |
| 4,386,145 | 5/1983 | Gilmour | 430/7 |
| 4,618,552 | 10/1986 | Tanaka et al. | 430/60 |
| 4,835,090 | 5/1989 | Sawyer et al. | 430/367 |
| 5,246,823 | 9/1993 | Shuman | 430/510 |
| 5,349,419 | 9/1994 | Taguchi et al. | 355/22 |
| 5,359,454 | 10/1994 | Steenblik et al. | 359/463 |

FOREIGN PATENT DOCUMENTS

| | | |
|---|---|---|
| 560 180 | 9/1993 | European Pat. Off. . |
| J5 1056 225 | 5/1976 | Japan . |
| 4 097 345 | 3/1992 | Japan . |
| 21367 | 8/1929 | Netherlands . |
| 312 992 | 5/1930 | United Kingdom . |
| 492 186 | 9/1938 | United Kingdom . |

*Primary Examiner*—Georgia Y. Epps
*Assistant Examiner*—Thomas Robbins
*Attorney, Agent, or Firm*—Gordon M. Stewart

[57] ABSTRACT

A method of exposing an integral imaging element having: an integral lens sheet with opposed front and back surfaces; and a light sensitive layer positioned behind the back surface;

the method comprising the steps of:

exposing the light sensitive layer with light from behind the back surface;

wherein the element additionally has an anti-halation layer on at least a portion of the front surface of the lens sheet which anti-halation layer, during exposure, reduces the amount of exposing light which would otherwise be reflected back toward the light sensitive layer from the front surface.

A system which can use the above method, and an integral image element of a type which can be produced by it, are also described.

25 Claims, 3 Drawing Sheets

INTEGRAL IMAGING WITH ANTI-HALATION

FIELD OF THE INVENTION

The invention relates generally to the field of integral image elements which may display depth, motion or other images, and methods of making such elements.

BACKGROUND OF THE INVENTION

Integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following United States patents: U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others; as well as allowed U.S. patent application Ser. No. 07/931,744. Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. Similar integral image elements, such as described in U.S. Pat. No. 3,268,238 and U.S. Pat. No. 3,538,632, can be used to convey a number of individual two-dimensional scenes (such as unrelated scenes or a sequence of scenes depicting motion) rather than one or more three-dimensional images.

Integral image elements using reflective layers behind the integral image to enhance viewing of the integral image by reflected light, are also described in U.S. Pat. No. 3,751,258, U.S. Pat. No. 2,500,511, U.S. Pat. No. 2,039,648, U.S. Pat. No. 1,918,705 and GB 492,186.

Previous lenticular imaging methods typically used a method for exposing the images through the lenticular material. This causes flair because multiple views must be exposed and each view introduces a background flair into the overall scene due to light scatter from the lenticular material. Resolution is also lost because the lenticular material does not have as high an optical resolution as is necessary for high quality imaging and as a consequence resolution is lost during the exposure of the image. In U.S. Pat. No. 5,276,478 a method is described where the light sensitive layer is exposed with light from behind the back surface rather than through the lenticular lens sheet. However, undesirable halation problems with subsequent reduction in image quality, could be caused by light which passes through the light sensitive layer and is reflected back to it from the front surface of the lens sheet.

Japanese published patent application JP 4097345 describes the use of an anti-reflection layer on the surface of the lenticules as well as an anti-halation or anti-reflection layer on opposite side from the lenticules. However, the light sensitive layer is exposed through the lenticules. The lenticule side anti-reflective layer appears intended to reduce scattering of light from the lenticule side during that type of exposure. The opposite side anti-halation layer uses dyes which are removed by processing solutions which must pass through the light sensitive emulsion layer to effect dye removal. U.S. Pat No. 1,817,963 describes a color photography technique using a dye on lenticules. However, the color "film" is intended for exposure in a camera with the lenticules facing the lens.

It would be desirable then, to provide a method of obtaining an integral image element by exposing a light sensitive layer on the back side of an integral lens sheet from behind the light sensitive layer so as to produce low flair and high resolution, which method also results in low halation. It would also be desirable for many applications, to provide an integral image element with good contrast of the image being viewed.

SUMMARY OF THE INVENTION

The present invention provides, in one aspect, a method of exposing an integral imaging element, which integral imaging element has: an integral lens sheet with opposed front and back surfaces; and has a light sensitive layer behind the back surface;

the method comprising the steps of:

exposing the light sensitive layer with light from behind the back surface;

wherein the element additionally has an anti-halation layer on at least a portion of the front surface of the lens sheet which anti-halation layer, during exposure, reduces the amount of exposing light which would otherwise be reflected back toward the light sensitive layer from the front surface.

In another aspect of the invention, a system for producing an integral image is provided, which system has: an integral lens sheet; a light sensitive layer on the back surface of the lens sheet; and an anti-halation layer; all of which are positioned and function as described above. The present invention further provides an integral image element having an integral lens sheet as described, an integral image positioned behind the back surface, and a reflective layer positioned behind the integral image. An anti-halation medium, such as a moth's eye lens layer on the front surface, is positioned forward of the integral image to reduce the amount of light which would otherwise be reflected back toward the integral image from the front surface.

The method and system of the present invention then, provide a means of obtaining an integral image element of the present invention, which has low flair and high resolution, as well as low halation. The integral image element of the present invention can provide good contrast of the image being viewed.

BRIEF DESCRIPTION OF THE DRAWINGS

To facilitate understanding, identical reference numerals have been used, where possible, to designate identical elements that are common to the figures.

EMBODIMENTS OF THE INVENTION

It will be appreciated in the present invention, that while the integral lens sheet could be a fly's eye lens sheet it is more preferably a lenticular lens sheet with lenticules on the front surface. Alternatively, the integral lens sheet could have regions of varying indices of refraction through its volume configured in such a way as to provide (in conjunction with the surfaces of the sheet, such as a curved external suface, flat external surface or some other shape) the same optical deflection of light rays as would be provided by a conventional fly's eye or lenticular lens sheet. Also, the back surface of the lens sheet may also be curved so as to either strengthen the lens effect or compensate for the curved focal plain which may be inherent in the lens consturction. Consequently, the curvature on the back side may be the of such a shape as to match the curvature of the focal plain of the lens. Further, by an "integral" image is referenced an image composed of segments (lines, in the case of a lenticular lens sheet) from at least one complete image (and often more than one image), which segments are aligned with respective individual lenses so that each of the one or more images is viewable when a user's eyes are at the correct angle relative to the imaging element. An "integral imaging element" in the present case is used to refer to a element which, when properly exposed and processed (as may be necessary), can produce an integral image element. By "light" in the present application is meant to include visible light, as well as infrared and ultraviolet light. By a light absorbing material is referenced a material which, at a minimum, absorbs at least one wavelength of the exposing light better than the antihalation layer and better than air. A preferred light absorbing material will be a black colored, non-reflective material.

Figure 1:
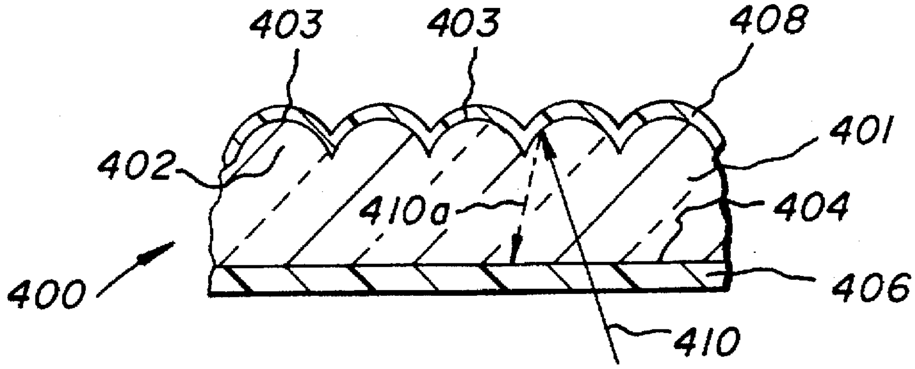
FIG. 1 is a cross-section illustrating a method and system of the present invention.

Referring now to FIG. 1, an integral imaging element 400 is shown which has an integral lens sheet 401 with opposed front and back surfaces 402, 404 respectively. Sheet 401 is of conventional construction with front surface 402 carrying the convex surfaces of a plurality of identical, elongated and adjacent partially cylindrical lens elements 403, while opposed back surface 404 is flat. A light sensitive layer 406, in the form of a conventional unexposed photographic emulsion, is positioned behind back surface 404, specifically by being directly attached to back surface 404. A thin emulsion layer 408, which acts as an anti-halation layer, covers front surface 402. Layer 408 is arranged to be black and highly light absorbing so that during exposure of light-sensitive layer 406 with light from behind the back surface, layer 408 will reduce the amount of exposing light which would otherwise be reflected back toward light sensitive layer 406 from front surface 402 absent layer 408. For example, if layer 408 was not present, during exposure with light from behind light-sensitive layer 406 a light ray 410 which passes through layer 406 and hits front surface 402, may be at least partially reflected back toward light sensitive layer 406 as indicated by reflection 410*a* (shown as a broken line). However, absorbing anti-halation layer 408 will absorb, at least partially, ray 410 and reduce or eliminate reflection 410*a*. This inhibits or prevents degradation of the image due to halation effects.

Once the material shown in FIG. 1 has been exposed to light it is processed using a photographic development process. Many suitable processes are known. In that process, any image in light sensitive layer 406 is developed and fixed in a permanent form in a manner well known in the photographic art. Light sensitive layer 406 thus becomes an image layer. Also, during that processing the absorption layer 408 becomes clear or alternatively or additionally, may also be washed off. This renders the final image element as a transparent lenticular image. Should it be desired to make a reflection image, the layer 406 (now the image layer) may be covered with a reflective coating (such as a metal film or white paint) placed immediately behind and adjacent layer 406.

Figure 2A:
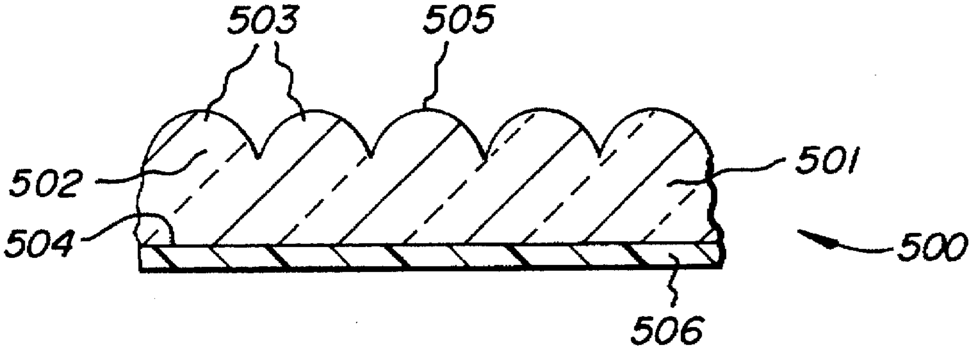
FIGS. 2 is cross-sections similar to FIG. 1 but showing the use of a different integral imaging element in the method and system of the present invention.
FIG. 2B is an enlarged view of a portion of FIG. 2A.
Figure 2B:
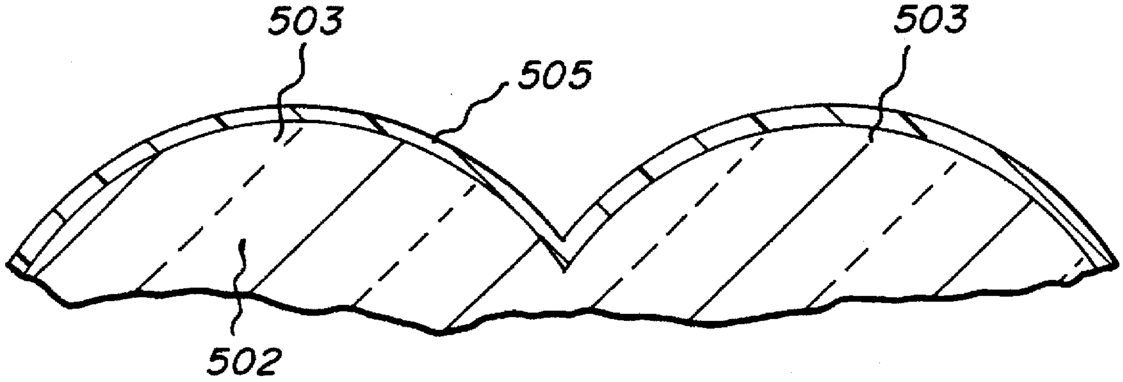

FIG. 2A again shows the construction of an integral imaging element 500 for use in the method and system of the present invention. Imaging element 500 has a lenticular lens sheet 501 with a front surface 502 carrying a plurality of adjacent, parallel, partially cylindrical elongated lenticules 503, and an opposed flat back surface 504, all in a known manner. Back surface 504 carries a light sensitive layer 506, in the form of a conventional unexposed photographic emulsion, attached immediately adjacent to back surface 504. Imaging element 500 also has an anti-halation layer in the form of a moth's eye lens surface 505 immediately adjacent to, and covering completely, front surface 502. The magnified view of FIG. 2B shows the moth's eye lens surface 505 more clearly. A moth's eye lens is a textured surface pattern which is a regular pattern comprising an arrangement of grooves or protuberances. The pitch of the pattern is smaller than the shortest wavelength within a predetermined band of radiation to be absorbed by the lens, and the depth (peak-to-trough) of the pattern is at least 100 nm. The pattern is preferably free from undercutting so as to be suitable for production or replication by molding, casting or embossing. Such patterns are described in U.S. Pat. No. 4,866,696 and U.S. Pat. No. 4,616,237. In practice it is preferred that moth's eye lens surface 505 is applied by being embossed on the chill roll which formed the lenticular front surface 502 during the extrusion process or may be formed through an aluminum oxide application technique such as described in U.S. Pat. No. 4,190,321 and U.S. Pat. No. 4,252,843. Moth's eye lens surface 505 preferably has a reflection coefficient of less than one percent in air (measured over the visible light spectrum).

Figure 3:
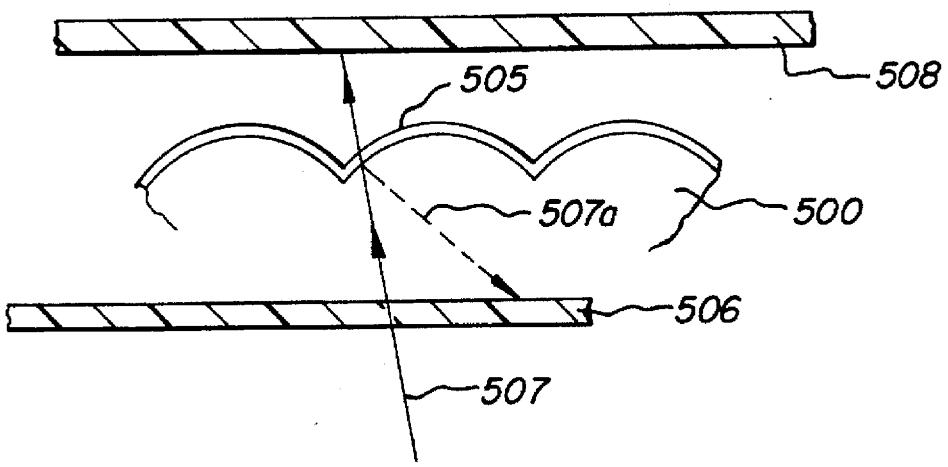
FIG. 3 is a cross-section illustrating a method and system of the present invention using the integral imaging element of FIG. 2.

As shown in FIG. 3, imaging element 500 may be exposed with light from behind light sensitive layer 506. An exposure light ray 507 which passes through light sensitive layer 506 will tend to pass directly through the moth's eye surface. A highly light absorbing layer 508 can optionally be positioned forward of moth's eye lens surface 505 to safely absorb light of ray 507 which passes through moth's eye lens surface 505. Layer 508 can be made of any suitable light absorbing material but is preferably a black, non-reflective material.

Thus, it will be appreciated that moth's eye lens surface 505 reduces or eliminates the amount of exposing light which would otherwise be reflected back toward the light sensitive layer 506 from front surface 502 absent surface 505. For example, a reflection 507*a* which might otherwise result from a portion of ray 507 being reflected back to light sensitive layer 506 by front surface 502, is reduced in intensity or eliminated by the presence of moth's eye lens surface 505.

Figure 4:
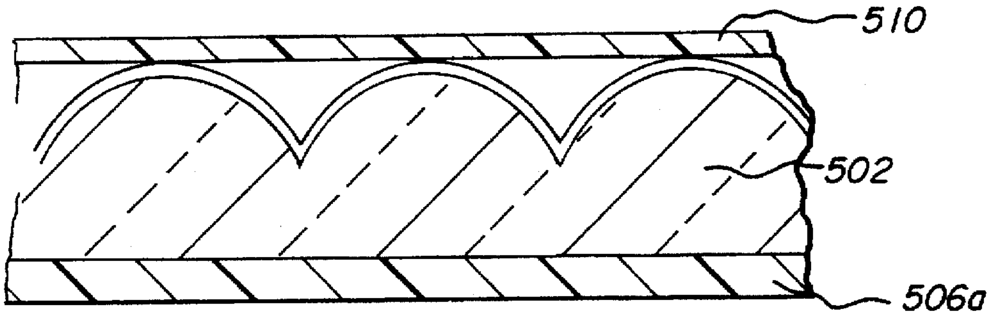
FIG. 4 is a cross-section illustrating the application of an overcoat on an integral image element produced from the method shown in FIG. 3.

An integral imaging element 500 may be processed, following exposure, in the same manner as already described in connection with integral imaging element 400 of FIG. 1. Light sensitive layer 506 then becomes image layer 506*a* such as shown in FIG. 4. However, moth's eye lens surface 505 will typically be of a material (such as an embossed layer on front surface 502, as described above) which is not removed by processing of the imaging element.

It is useful that moth's eye surface 505 remains after processing though, since the moth's eye lens effect also improves the contrast range when viewing the image either in reflection or in transmission.

The resulting image element (which will be an integral image element if the exposing light was from an integral image) will have an image viewable by transmission. If it is desired to have an image viewable by reflection, a reflective layer can be coated immediately adjacent and behind image layer 506*a* in a similar manner as discussed in connection with the image element produced using imaging element 400 of FIG. 1.

Figure 5:
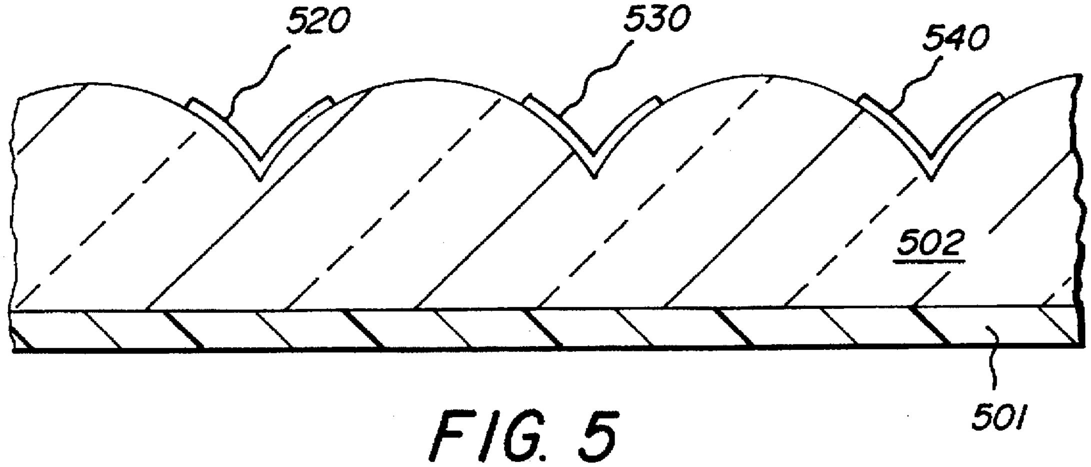
FIG. 5 is a cross-section similar to FIG. 3 but using a modified integral imaging element.

To overcome the fingerprinting problem of moth's eye surfaces a protective overcoat layer 510 may be placed above and in contact with the front surface 502 after imaging element 500 has been processed. Alternatively, because fingerprints will primarily occur on the peaks of lenticules 503, moth's eye surface 505 may be limited to valley areas such as 520, 530, and 540, between all lenticules 503, as best shown in FIG. 5.

In another method of the present invention, integral image quality is improved and halation again reduced during exposure. This method again uses a lenticular lens sheet as previously described in connection with FIGS. 1–5, and which has a light sensitive layer on the back surface. In this method an anti-halation layer covers the front surface of a lenticular lens sheet, which anti-halation layer more closely matches the refractive index of the material from which the lenticular lens sheet is made, than does air (the front surface previously typically being in contact with air during exposure of the light sensitive layer). Preferably this anti-halation layer has a refractive index which closely matches that of the material forming the lenticular lens sheet. A light absorbing material is preferably positioned forward of such an anti-halation layer during exposure of the light sensitive layer.

Figure 6:
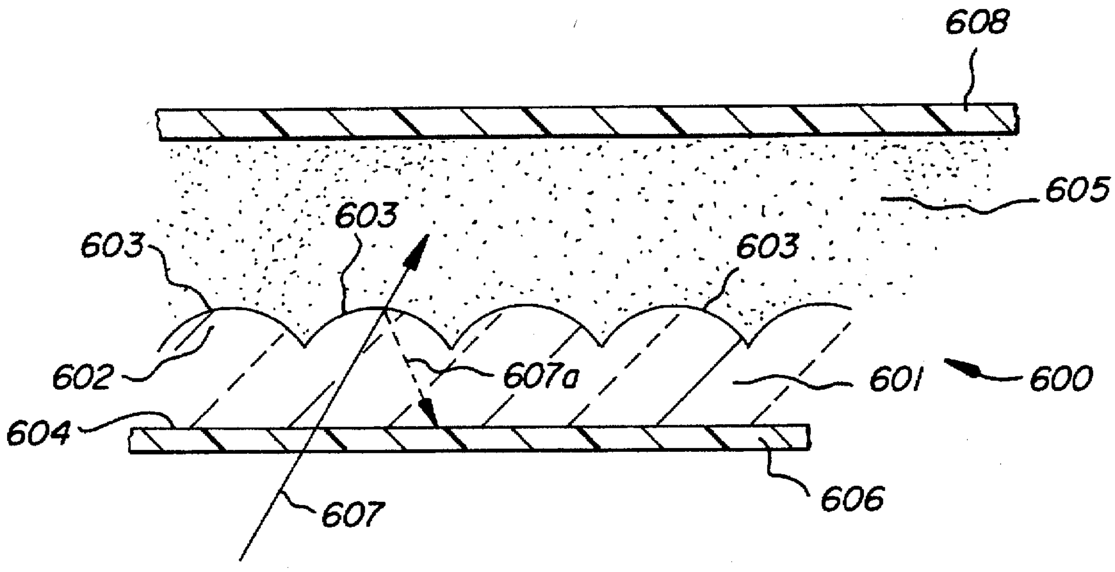
FIG. 6 is a cross-section illustrating another method and system of the present invention.

A system of the foregoing type is shown in FIG. 6. In FIG. 6 integral imaging element 600 has a lenticular lens sheet 601 with opposed front and back surfaces 602, 604 respectively. Front surface 602 carries convex surfaces of lenticules 603 while back surface 604 is flat. Integral imaging element 600 also includes a light sensitive layer 606 in the form of a conventional unexposed photographic emulsion. All of the foregoing elements may be constructed the same as in lenticular imaging element 500 of FIGS. 2A and 2B.

During exposure of integral imaging element 605 with light from behind light sensitive layer 606 (that is, from beneath layer 606 as shown in FIG. 6), an anti-halation layer 605 is in contact with and covers the entire front surface 602. Anti-halation layer 605 is preferably a liquid whose refractive index is closer to that of the material of lenticular lens sheet 601 than is air, and preferably closely matches the refractive index of the material of lens sheet 601. A solid material with the similar relative refractive index could be used instead of a liquid, but is less preferred since the liquid is very readily removed and can be readily re-used. The liquid of anti-halation layer 605 is bounded at a position forward of anti-halation layer 605 by a highly light absorbing (for example, black) layer 608.

Anti-halation layer 605 will act to reduce the amount of exposing light which would otherwise be reflected back toward light sensitive layer from front surface 602, during exposure of light sensitive layer 606 with light from behind layer 606. For example, in the absence of anti-halation layer 605 a light ray 607 which, during such exposure, passes through light sensitive layer 606 will tend to be at least partially reflected by front surface 602 (which would typically be in contact with air) as a reflection 607*a*. However, since anti-halation layer 605 has a refractive index closely matching that of the material of lenticular lens sheet 601, reflection 607*a* is eliminated or reduced in intensity over that which would be present absent anti-halation layer 605. Eventually ray 607 reaches highly light absorbing layer 608 where it is absorbed thereby preventing it being scattered back toward light sensitive layer 606.

After exposure of element 600, layer 608 is removed and the liquid of anti-halation layer 605 is washed off front surface 602 during the development process (which may be of a type already mentioned). Again, a reflective coating may be applied immediately adjacent and behind layer 606 (which is now an image layer), if an image element viewable by reflective light is desired.

It will be appreciated that in the present invention, it is not necessary that the light sensitive layer be positioned directly adjacent the back side of a lenticular lens sheet. For example, the light sensitive layer could be attached to the back side of a transparent spacer, with the front side of the transparent spacer (that is, the side not coated with the light sensitive layer) being directly attached to the back side of the lenticular lens sheet. This arrangement allows one to assemble a lenticular imaging element of the present invention by using a conventional photographic color film with its emulsion layers on a transparent base, by attaching the transparent base to the back side of a lenticular lens sheet. Further, it will be appreciated that each of the anti-halation layers shown can be much thinner than illustrated. The thickness can be selected bearing in mind the particular material being used and its desired properties.

As previously mentioned, exposing any of the integral imaging elements previously described, from behind with a light pattern which represents an integral image and processing the exposed element (as may be required) to produces a visible integral image, results in an integral image element of the present invention. The formation of suitable integral images by interlacing lines from different scenes, and their exposing or writing to the back side of integral imaging elements, is described for example, in U.S. Pat. No. 5,278,608, U.S. Pat. No. 5,276,478 and U.S. Pat. No. 5,455,689. The integral image can, for example, be made of two or more images of a scene taken at different perspectives (that is, at different angular positions with respect to the scene). Such an integral image, when recorded on the light sensitive layer and viewed from a position forward of the front side of the lenticular lens sheet, may provide one or more three-dimensional images. By a "three-dimensional image", is meant an integral image which, when viewed through the front side of the lens sheet (that is viewed through the lens elements), has a visible depth element as a result of the various views being relationally configured to appear as the views that would be seen from different positions when actually viewing a three-dimensional object. A depth element means the ability to at least partially look around an object in the scene. This can be obtained by interlacing lines from different perspective views of the same scene, in a known manner. Thus, a three-dimensional image necessarily includes at least two views of a scene. Alternatively or additionally, the integral image may contain one or more two-dimensional images which may be recorded in alignment with the lens sheet so as to be viewable when the lenticules are positioned horizontally or vertically with respect to the user's eyes.

The invention has been described with reference to a preferred embodiment. However, it will be appreciated that variations and modifications can be effected by a person of ordinary skill in the art without departing from the scope of the invention.

PARTS LIST

400 Imaging Element
401 Lens Sheet
402 Front Surface
403 Lens Elements
404 Back Surface
406 Light Sensitive Layer
408 Absorption Layer
410 Light Ray
**410*a*** Reflection
500 Imaging Element
501 Lens Sheet
502 Front Surface
503 Lenticules
504 Back Surface
505 Moth's Eye Lens Surface
506 Light Sensitive Layer
**506*a*** Image Layer
507 Light Ray
**507*a*** Reflection
508 Light Absorbing Layer
510 Protective Overcoat Layer
520 Valley Area
530 Valley Area
540 Valley Area
600 Imaging Element
601 Lens Sheet
602 Front Surface
603 Lenticules
604 Back Surface
605 Anti-Halation Layer
606 Layer
607 Light Ray
**607*a*** Reflection
608 Light Absorbing Layer

We claim:

1. A method of exposing an integral imaging element having: an integral lens sheet with opposed front and back surfaces; and a light sensitive layer positioned behind the back surface;

the method comprising the steps of:

exposing the light sensitive layer with light from behind the back surface;

wherein the element additionally has an anti-halation layer on at least a portion of the front surface of the lens sheet which anti-halation layer, during exposure, reduces the amount of exposing light which would otherwise be reflected back toward the light sensitive layer from the front surface.

2. A method according to claim 1 wherein the integral lens sheet is a lenticular lens sheet with lenticules on the front surface.

3. A method according to claim 2 wherein the light sensitive layer is exposed from the back side with an integral image.

4. A method according to claim 1 wherein the light sensitive layer is positioned immediately adjacent the back surface of the integral lens sheet.

5. A method according to claim 4 wherein the anti-halation layer is a layer of a material which absorbs exposing light.

6. A method according to claim 4 wherein the anti-halation layer is of a material having a refractive index which more closely matches the refractive index of the material of the integral lens sheet than does air.

7. A method according to claim 6 wherein the anti-halation layer is a liquid.

8. A method according to claim 6 wherein a light absorbing material is positioned forward of the anti-halation layer during exposure of the light sensitive layer.

9. A method according to claim 8 wherein the light sensitive layer is exposed from the back side with an integral image.

10. A method according to claim 6 wherein the light sensitive layer is exposed from the back side with an integral image.

11. A method according to claim 1 wherein the anti-halation layer is of a different material from the integral lens sheet.

12. A method according to claim 11 wherein the anti-halation layer comprises a moth's eye lens layer.

13. A method according to claim 1 wherein the anti-halation layer is removed following exposure of the light sensitive layer.

14. A method according to claim 1 additionally comprising, following exposure, processing the light sensitive layer to fix any image from exposure, and covering the light sensitive layer with a reflective layer.

15. A method according to claim 1 wherein the light sensitive layer is exposed from the back side with an integral image.

16. A system for producing an integral imaging, comprising:

an integral lens sheet with opposed front and back surfaces;

a light sensitive layer positioned behind the back surface;

an anti-halation layer on the front surface of the lens sheet which anti-halation layer, during exposure of the light sensitive layer with light from behind the back surface, reduces the amount of exposing light which would otherwise be reflected back toward the light sensitive layer from the front surface; and a light source positioned to expose the light sensitive layer from behind the back surface;

wherein the anti-halation layer comprises a moth's eye layer of the same or different material as the integral lens sheet.

17. A system according to claim 16 wherein the integral lens sheet is a lenticular lens sheet with the lenticules on the front surface of the sheet.

18. A system according to claim 16 wherein the light sensitive layer is positioned immediately adjacent the back surface of the integral lens sheet.

19. A system for producing an integral image, comprising:

an integral lens sheet with opposed front and back surfaces;

a light sensitive layer positioned behind the back surface;

an anti-halation layer on the front surface of the lens sheet which anti-halation layer, during exposure of the light sensitive layer with light from behind the back surface, reduces the amount of exposing light which would otherwise be reflected back toward the light sensitive layer from the front surface; and a light source positioned to expose the light sensitive layer from behind the back surface;

wherein the anti-halation layer is of a material having a refractive index which more closely matches the refractive index of the material of the integral lens sheet than does air.

20. A system according to claim 19 wherein the integral lens sheet is a lenticular lens sheet with lenticules on the front surface.

21. A system according to claim 19 wherein the light sensitive layer is positioned immediately adjacent the back surface of the integral lens sheet.

22. A system for producing an integral image, comprising:

an integral lens sheet with opposed front and back surfaces;

a light sensitive layer positioned behind the back surface; and an anti-halation layer on the front surface of the lens sheet which anti-halation layer, during exposure of the light sensitive layer with light from behind the back surface, reduces the amount of exposing light which would otherwise be reflected back toward the light sensitive layer from the front surface;

wherein the anti-halation layer is of a material having a refractive index which more closely matches the refractive index of the material of the integral lens sheet than does air;

additionally comprising a light absorbing material positioned in front of the anti-halation layer.

23. An integral image element, comprising:

an integral lens sheet with opposed front and back surfaces;

an integral image positioned behind the back surface;

a reflective layer positioned behind the integral image; and an anti-halation medium positioned forward of the integral image, which anti-halation layer reduces the amount of light which would otherwise be reflected back toward the integral image from the front surface.

24. An integral image element according to claim 23 wherein the anti-halation medium is moth's eye lens layer covering at least a portion of the front surface of the integral lens sheet.

25. An integral image element according to claim 23 wherein the integral lens sheet is a lenticular lens sheet with lenticules on the front surface.

* * * * *